Oct. 25, 1932. W. C. WOLFORTH 1,884,474
FRONT WHEEL DRIVE
Filed Aug. 15, 1929 2 Sheets-Sheet 2
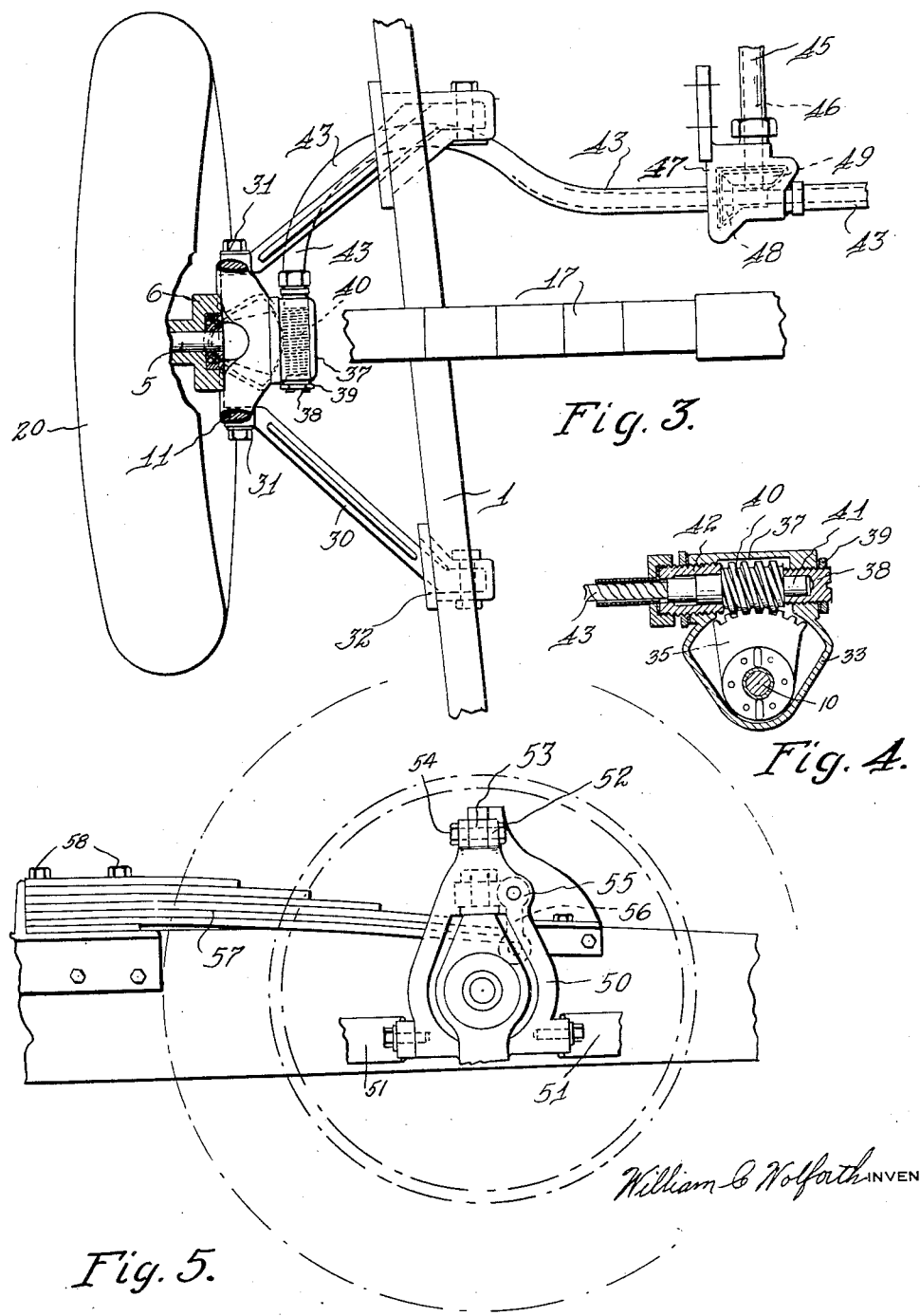

Patented Oct. 25, 1932

1,884,474

UNITED STATES PATENT OFFICE

WILLIAM C. WOLFORTH, OF HIGHLAND PARK, MICHIGAN

FRONT WHEEL DRIVE

Application filed August 15, 1929. Serial No. 386,147.

The present invention pertains to a novel front wheel drive for motor vehicles, and the principal object is to provide a device of this character having the well known advantages of a front wheel drive and also certain other advantages peculiar to the present construction.

One of the special objects of the invention is to eliminate the front axle and hence the transmission of shocks from wheel to wheel across the front end. Instead of a front axle extending across the front of the vehicle, there are provided two separate axles which are linked to the frame. Such links take the transverse thrust from the wheels to the frame much more satisfactorily than do the front springs which usually must serve this purpose. The links further provide greater flexibility between the frame and the wheels.

Another special object of the invention is to reduce shimmying of the front wheels, and this object is accomplished by an individual steering mechanism for each wheel, which mechanism also reduces the lost motion between the steering post and the front wheels.

The invention is fully disclosed by way of example in the following description and in the accompanying drawings in which Figure 1 is a vertical cross section, partly in elevation, at the front end of the vehicle;

Figure 3 is a plan view, partly in section;

Figure 4 is a detail view of the steering gear at the front wheel, and

Figure 5 is a side elevation of the modified construction.

Reference to these views will now be made by use of like characters which are employed to designate corresponding parts throughout.

Figure 1:
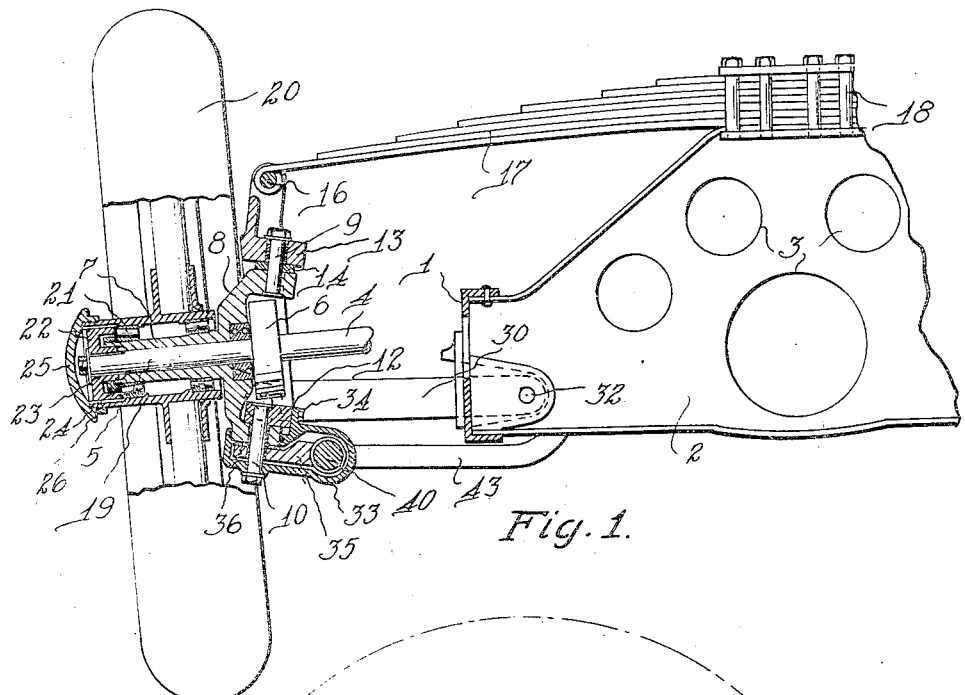
Figure 2:
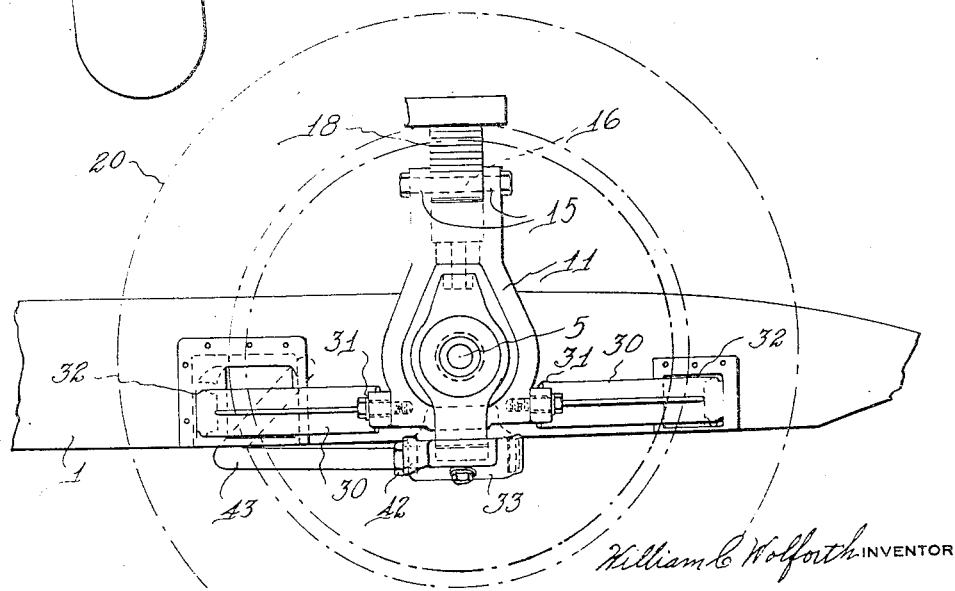
Figure 2 is a side elevation thereof.

In the several figures is illustrated a chassis frame which includes longitudinal side members 1 joined together at their front ends by a front frame member 2 as shown more clearly in Figure 1. The construction at the rear end of the frame is immaterial for the purposes of the present invention.

The member 2 is provided with apertures 3 for the attachment of a suitable transmission mechanism from which extends a propeller shaft 4 towards the sides of the vehicle. At each end of the shaft is provided an end section 5 connected to the main portion of the shaft by a universal joint 6 which is illustrated more or less diagrammatically in Figure 1.

Inasmuch as the assemblies at both ends of the shaft are alike, only one of them need be described. On the universally jointed end section 5 is mounted an axle member 7 formed also with a yoke portion 8 on the end of the axle nearer the frame side 1 and enclosing the universal joint 6. The yoke member is fitted with king pins 9 and 10 at the top and bottom thereof respectively, for the swiveled support of a ring member 11 which rests on the bottom of the yoke as indicated at 12 in Figure 1 and which has a bridge piece 13 lying over the yoke. A thrust bearing 14 is inserted between the yoke and the bridge piece. The latter is further formed with a pair of upstanding lugs 15 carrying a transverse lug 16 and thus forming a shackle for a leaf spring 17 having its end attached to the bolt and its center portion fixed to the top of the front member 2 as indicated by the numeral 18.

Over the body of the axle is fitted the hub 19 of a wheel 20, and suitable roller bearings 21 are interposed between the axle and the hub. Over the extremity of the end section 5 is a locking member 22 which is splined to the section 5 at 23 and to the hub 19 at 24, thereby establishing a driving connection between the shaft end 5 and the wheel. The assembly is enclosed by a hub cap 25 screwed over the outer end of the hub. It will also be seen that the outer end of the axle 7 is threaded to receive a ring 26 screwed thereon and abutting the outer roller bearings 21 which may thereby be adjusted.

The axle member is connected to the frame by a pair of links 30 having their outer ends pivotally attached to the ring portion 11 as at 31 and diverging towards the adjacent frame side 1 to which they are pivotally attached by suitable connecting devices 32 as illustrated more clearly in Figures 1 and 3.

To the bottom of the ring portion 11 is attached a casing 33 held by the king pin 10 and further secured to the bottom 12 of the ring 11 by bolts 34. Within the casing is disposed a quadrant 35 surrounding the lower pin 10 and keyed to the yoke as indicated by the numeral 36 in Figure 1. The casing is formed with an inward cylindrical section 37 having a nut 38 threaded into the forward end thereof and held by a lock nut 39 as shown more clearly in Figure 4. Within the cylindrical section is journaled a worm 40 meshing with the quadrant and supported at one end by a stud 41 which has a bearing in the nut 38. At the other end, the casing is equipped with another nut 42 having however, an aperture passing entirely therethrough. A flexible shaft 43 passes through the last named nut and is fixed to the remaining end of the worm. By means of the nuts 38 and 42, the worm may be adjusted to keep the front wheels in perfect alinement and take up the wear between it and the quadrant.

In Figure 3 is illustrated a conventional steering column 45 having the usual steering post 46 therein. The lower end of the steering post projects beyond the column and is journaled in a suitable bracket 47. The flexible shaft 43 also passes through the bracket and is equipped with a beveled gear 48 meshing with another beveled gear 49 on the shaft 46. The flexible shaft is extended to the other side of the vehicle and connected to another worm similar to that already described for actuating the other front wheel, so that on turning the shaft 46 in the usual manner, both front wheels simultaneously receive equal steering displacement through the two worms and the flexible shaft 43 which is common thereto.

In Figure 5 is illustrated a modified construction wherein still another link between the front wheel and the frame is provided. The ring member 50 is similar to the ring 11 previously described and has a pair of links 51 pivoted to the base thereof and attached to the side member as already described. The top of the ring is however, formed with a pair of ears 52 between which is pivoted one end of a third link 53 by means of a bolt 54, the other end of the link being suitably attached to the adjacent side frame.

At one side of the ring is formed a lug 55 for the attachment of a shackle 56 thereto. The shackle supports one end of the spring 57 lying substantially parallel to the axis of the vehicle and having its other end clamped to the side frame as indicated by the numeral 58. This construction relieves the spring of the stresses placed upon it in the construction shown in Figure 1 and causes these stresses to be taken up by the third link 53.

It will now be apparent that, as stated in the introduction to this description, a front axle extending across the vehicle is not used and is replaced by articulated connections between the frame sides and each front wheel. These connections in the nature of links are very well adapted to take the thrust from the front wheels to the frame and further provide greater than usual flexibility between the wheels and the frame, resulting in easier riding qualities and less transmission of shocks to the frame. The same link construction is also applicable in a wheel mounting at the rear end of the vehicle.

It will also be seen that each wheel is individually steered by its own gearing, although both sets of gearing are actuated from a common shaft controlled by the usual steering post.

Although specific embodiments of the invention have been illustrated and described, it will be understood that various alterations in the details of construction may be made without departing from the scope of the invention as indicated by the appended claim.

What I claim is:

In a front wheel drive, a chassis frame having a front cross member, a propeller shaft mounted across said frame and having a universally jointed end, a front axle mounted on said end, a ring enclosing a portion of said axle and swivelled thereto, a pair of links diverging from opposite sides of said ring to said frame and pivoted to the ring and frame, and a wheel journalled to said axle.

In testimony whereof I affix my signature.

WILLIAM C. WOLFORTH.